United States Patent
Xu et al.

(10) Patent No.: US 9,241,354 B2
(45) Date of Patent: Jan. 19, 2016

(54) METHOD AND APPARATUS FOR INITIATING X2 INTERFACE SETUP IN WIRELESS COMMUNICATION SYSTEM

(75) Inventors: Jian Xu, Anyang-si (KR); Kyung Min Park, Anyang-si (KR); Gene Beck Hahn, Anyang-si (KR); Sung Hoon Jung, Anyang-si (KR)

(73) Assignee: LG ELECTRONICS INC., Seoul (KR)

( * ) Notice: Subject to any disclaimer, the term of this patent is extended or adjusted under 35 U.S.C. 154(b) by 141 days.

(21) Appl. No.: 13/985,181

(22) PCT Filed: Apr. 27, 2012

(86) PCT No.: PCT/KR2012/003292
§ 371 (c)(1),
(2), (4) Date: Aug. 13, 2013

(87) PCT Pub. No.: WO2012/148217
PCT Pub. Date: Nov. 1, 2012

(65) Prior Publication Data
US 2013/0322390 A1    Dec. 5, 2013

Related U.S. Application Data

(60) Provisional application No. 61/479,861, filed on Apr. 28, 2011.

(51) Int. Cl.
| | |
|---|---|
| *H04W 92/20* | (2009.01) |
| *H04W 76/02* | (2009.01) |
| *H04W 8/26* | (2009.01) |
| *H04W 24/02* | (2009.01) |
| *H04W 84/04* | (2009.01) |

(52) U.S. Cl.
CPC .............. *H04W 76/02* (2013.01); *H04W 92/20* (2013.01); *H04W 8/26* (2013.01); *H04W 24/02* (2013.01); *H04W 84/045* (2013.01)

(58) Field of Classification Search
CPC ............ H04W 56/0015; H04W 36/02; H04W 92/045; H04W 36/12; H04L 63/102
See application file for complete search history.

(56) References Cited

U.S. PATENT DOCUMENTS

| | | | |
|---|---|---|---|
| 8,160,590 B2 * | 4/2012 | Mueck et al. | ................. 455/444 |
| 8,249,020 B2 * | 8/2012 | Qiu | ........................ H04W 36/02 370/252 |
| 8,532,694 B2 * | 9/2013 | Gupta | ........................... 455/525 |
| 8,606,310 B2 * | 12/2013 | Oh | ..................... H04W 72/0426 455/418 |
| 8,630,263 B2 * | 1/2014 | Qiu | ........................ H04W 36/02 370/331 |

(Continued)

FOREIGN PATENT DOCUMENTS

CN    102014449 A    4/2011

*Primary Examiner* — Brian O'Connor
(74) *Attorney, Agent, or Firm* — Birch, Stewart, Kolasch & Birch, LLP

(57) ABSTRACT

A method and apparatus for transmitting a transport network layer (TNL) address in a wireless communication system is provided. A home eNodeB (HeNB)/X2-proxy determines a TNL address and an eNB ID to be transmitted in a configuration transfer message based on an indication whether a direct X2 interface or an indirect X2 interface is to be established between a macro eNB and a HeNB. Or, in case that the direct X2 interface between the macro eNB and the HeNB is not available, the HeNB GW/X2-proxy modifies the TNL address of the HeNB and the eNB ID of the HeNB in the configuration transfer message into a TNL address of the NeNB GW/X2-proxy and an eNB ID of the HeNB GW/X2-proxy.

14 Claims, 10 Drawing Sheets

(56) References Cited

U.S. PATENT DOCUMENTS

| | | | | |
|---|---|---|---|---|
| 8,711,806 B2* | 4/2014 | Lim | H04W 36/02 | |
| | | | 370/331 | |
| 8,942,249 B2* | 1/2015 | Qiu | H04W 36/02 | |
| | | | 370/252 | |
| 2010/0046476 A1* | 2/2010 | Qiu | H04W 36/02 | 370/331 |
| 2010/0169412 A1 | 7/2010 | Gupta | | |
| 2010/0260168 A1 | 10/2010 | Gheorghiu et al. | | |
| 2010/0273468 A1* | 10/2010 | Bienas et al. | | 455/418 |
| 2011/0314542 A1* | 12/2011 | Viswanathan et al. | | 726/23 |
| 2012/0076121 A1* | 3/2012 | Choi et al. | | 370/338 |
| 2012/0252437 A1* | 10/2012 | Garcia et al. | | 455/423 |

\* cited by examiner (a)

(b)

METHOD AND APPARATUS FOR INITIATING X2 INTERFACE SETUP IN WIRELESS COMMUNICATION SYSTEM

CROSS-REFERENCE TO RELATED APPLICATIONS

This application is the National Phase of PCT/KR2012/003292 filed on Apr. 27, 2012, which claims priority under 35 U.S.C. 119(e) to U.S. Provisional Application No. 61/479,861 filed on Apr. 28, 2011, all of which are hereby expressly incorporated by reference into the present application.

TECHNICAL FIELD

The present invention relates to wireless communication, and more particularly, to a method and apparatus for initiating an X2 interface setup in a wireless communication system.

BACKGROUND ART

Universal mobile telecommunications system (UMTS) is a 3rd generation (3G) asynchronous mobile communication system operating in wideband code division multiple access (WCDMA) based on European systems, global system for mobile communications (GSM) and general packet radio services (GPRS). The long-term evolution (LTE) of UMTS is under discussion by the 3rd generation partnership project (3GPP) that standardized UMTS.

The 3GPP LTE is a technology for enabling high-speed packet communications. Many schemes have been proposed for the LTE objective including those that aim to reduce user and provider costs, improve service quality, and expand and improve coverage and system capacity. The 3GPP LTE requires reduced cost per bit, increased service availability, flexible use of a frequency band, a simple structure, an open interface, and adequate power consumption of a terminal as an upper-level requirement.

FIG. 1 shows network structure of an evolved universal mobile telecommunication system (E-UMTS). The E-UMTS may be also referred to as an LTE system. The communication network is widely deployed to provide a variety of communication services such as voice over internet protocol (VoIP) through IMS and packet data.

As illustrated in FIG. 1, the E-UMTS network includes an evolved UMTS terrestrial radio access network (E-UTRAN), an evolved packet core (EPC) and one or more user equipment. The E-UTRAN may include one or more evolved NodeB (eNB) 20, and a plurality of user equipment (UE) 10. One or more E-UTRAN mobility management entity (MME)/system architecture evolution (SAE) gateways (S-GW) 30 may be positioned at the end of the network and connected to an external network.

As used herein, "downlink" refers to communication from eNB 20 to UE 10, and "uplink" refers to communication from the UE to an eNB. UE 10 refers to communication equipment carried by a user and may be also referred to as a mobile station (MS), a user terminal (UT), a subscriber station (SS) or a wireless device.

An eNB 20 provides end points of a user plane and a control plane to the UE 10. MME/S-GW 30 provides an end point of a session and mobility management function for UE 10. The eNB and MME/S-GW may be connected via an S1 interface.

The eNB 20 is generally a fixed station that communicates with a UE 10, and may also be referred to as a base station (BS) or an access point. One eNB 20 may be deployed per cell. An interface for transmitting user traffic or control traffic may be used between eNBs 20.

The MME provides various functions including non-access stratum (NAS) signaling to eNBs 20, NAS signaling security, access stratum (AS) security control, Inter core network (CN) node signaling for mobility between 3GPP access networks, Idle mode UE reachability (including control and execution of paging retransmission), tracking area list management (for UE in idle and active mode), packet data network (PDN) GW and serving GW selection, MME selection for handovers with MME change, serving GPRS support node (SGSN) selection for handovers to 2G or 3G 3GPP access networks, roaming, authentication, bearer management functions including dedicated bearer establishment, support for public warning system (PWS) (which includes earthquake and tsunami warning system (ETWS) and commercial mobile alert system (CMAS)) message transmission. The S-GW host provides assorted functions including per-user based packet filtering (by e.g. deep packet inspection), lawful interception, UE internet protocol (IP) address allocation, transport level packet marking in the downlink, UL and DL service level charging, gating and rate enforcement, DL rate enforcement based on APN-AMBR. For clarity MME/S-GW 30 will be referred to herein simply as a "gateway," but it is understood that this entity includes both an MME and an SAE gateway.

A plurality of nodes may be connected between eNB 20 and gateway 30 via the S1 interface. The eNBs 20 may be connected to each other via an X2 interface and neighboring eNBs may have a meshed network structure that has the X2 interface.

FIG. 2 shows architecture of a typical E-UTRAN and a typical EPC.

As illustrated, eNB 20 may perform functions of selection for gateway 30, routing toward the gateway during a radio resource control (RRC) activation, scheduling and transmitting of paging messages, scheduling and transmitting of broadcast channel (BCH) information, dynamic allocation of resources to UEs 10 in both uplink and downlink, configuration and provisioning of eNB measurements, radio bearer control, radio admission control (RAC), and connection mobility control in LTE_ACTIVE state. In the EPC, and as noted above, gateway 30 may perform functions of paging origination, LTE_IDLE state management, ciphering of the user plane, SAE bearer control, and ciphering and integrity protection of NAS signaling.

FIG. 3 shows a user-plane protocol and a control-plane protocol stack for the E-UMTS.

FIG. 3(a) is block diagram depicting the user-plane protocol, and FIG. 3(b) is block diagram depicting the control-plane protocol. As illustrated, the protocol layers may be divided into a first layer (L1), a second layer (L2) and a third layer (L3) based upon the three lower layers of an open system interconnection (OSI) standard model that is well known in the art of communication systems.

The physical layer, the L1, provides an information transmission service to an upper layer by using a physical channel. The physical layer is connected with a medium access control (MAC) layer located at a higher level through a transport channel, and data between the MAC layer and the physical layer is transferred via the transport channel. Between different physical layers, namely, between physical layers of a transmission side and a reception side, data is transferred via the physical channel.

The MAC layer of the L2 provides services to a radio link control (RLC) layer (which is a higher layer) via a logical channel. The RLC layer of the L2 supports the transmission of data with reliability. It should be noted that the RLC layer illustrated in FIGS. 3(a) and 3(b) is depicted because if the RLC functions are implemented in and performed by the MAC layer, the RLC layer itself is not required. A packet data convergence protocol (PDCP) layer of the L2 performs a header compression function that reduces unnecessary control information such that data being transmitted by employing IP packets, such as IPv4 or IPv6, can be efficiently sent over a radio (wireless) interface that has a relatively small bandwidth.

A radio resource control (RRC) layer located at the lowest portion of the L3 is only defined in the control plane and controls logical channels, transport channels and the physical channels in relation to the configuration, reconfiguration, and release of the radio bearers (RBs). Here, the RB signifies a service provided by the L2 for data transmission between the terminal and the UTRAN.

As illustrated in FIG. 3(a), the RLC and MAC layers (terminated in an eNB 20 on the network side) may perform functions such as scheduling, automatic repeat request (ARQ), and hybrid automatic repeat request (HARM). The PDCP layer (terminated in eNB 20 on the network side) may perform the user plane functions such as header compression, integrity protection, and ciphering.

As illustrated in FIG. 3(b), the RLC and MAC layers (terminated in an eNodeB 20 on the network side) perform the same functions for the control plane. As illustrated, the RRC layer (terminated in an eNB 20 on the network side) may perform functions such as broadcasting, paging, RRC connection management, RB control, mobility functions, and UE measurement reporting and controlling. The NAS control protocol (terminated in the MME of gateway 30 on the network side) may perform functions such as a SAE bearer management, authentication, LTE_IDLE mobility handling, paging origination in LTE_IDLE, and security control for the signaling between the gateway and UE 10.

The RRC state may be divided into two different states such as a RRC_IDLE and a RRC_CONNECTED. In RRC_IDLE state, the UE 10 may receive broadcasts of system information and paging information while the UE specifies a discontinuous reception (DRX) configured by NAS, and the UE has been allocated an identification (ID) which uniquely identifies the UE in a tracking area and may perform PLMN selection and cell re-selection. Also, in RRC_IDLE state, no RRC context is stored in the eNB.

In RRC_CONNECTED state, the UE 10 has an E-UTRAN RRC connection and a context in the E-UTRAN, such that transmitting and/or receiving data to/from the network (eNB) becomes possible. Also, the UE 10 can report channel quality information and feedback information to the eNB.

In RRC_CONNECTED state, the E-UTRAN knows the cell to which the UE 10 belongs. Therefore, the network can transmit and/or receive data to/from UE 10, the network can control mobility (handover and inter-radio access technologies (RAT) cell change order to GSM EDGE radio access network (GERAN) with network assisted cell change (NACC)) of the UE, and the network can perform cell measurements for a neighboring cell.

In RRC_IDLE state, the UE 10 specifies the paging DRX cycle. Specifically, the UE 10 monitors a paging signal at a specific paging occasion of every UE specific paging DRX cycle.

The paging occasion is a time interval during which a paging signal is transmitted. The UE 10 has its own paging occasion.

A paging message is transmitted over all cells belonging to the same tracking area. If the UE 10 moves from one tracking area to another tracking area, the UE will send a tracking area update message to the network to update its location.

FIG. 4 shows an example of structure of a physical channel.

The physical channel transfers signaling and data between layer L1 of a UE and eNB. As illustrated in FIG. 4, the physical channel transfers the signaling and data with a radio resource, which consists of one or more sub-carriers in frequency and one more symbols in time.

One sub-frame, which is 1 ms in length, consists of several symbols. The particular symbol(s) of the sub-frame, such as the first symbol of the sub-frame, can be used for downlink control channel (PDCCH). PDCCHs carry dynamic allocated resources, such as PRBs and modulation and coding scheme (MCS).

A transport channel transfers signaling and data between the L1 and MAC layers. A physical channel is mapped to a transport channel.

Downlink transport channel types include a broadcast channel (BCH), a downlink shared channel (DL-SCH), a paging channel (PCH) and a multicast channel (MCH). The BCH is used for transmitting system information. The DL-SCH supports HARQ, dynamic link adaptation by varying the modulation, coding and transmit power, and both dynamic and semi-static resource allocation. The DL-SCH also may enable broadcast in the entire cell and the use of beamforming. The PCH is used for paging a UE. The MCH is used for multicast or broadcast service transmission.

Uplink transport channel types include an uplink shared channel (UL-SCH) and random access channel(s) (RACH). The UL-SCH supports HARQ and dynamic link adaptation by varying the transmit power and potentially modulation and coding. The UL-SCH also may enable the use of beamforming. The RACH is normally used for initial access to a cell.

The MAC sublayer provides data transfer services on logical channels. A set of logical channel types is defined for different data transfer services offered by MAC. Each logical channel type is defined according to the type of information transferred.

Logical channels are generally classified into two groups. The two groups are control channels for the transfer of control plane information and traffic channels for the transfer of user plane information.

Control channels are used for transfer of control plane information only. The control channels provided by MAC include a broadcast control channel (BCCH), a paging control channel (PCCH), a common control channel (CCCH), a multicast control channel (MCCH) and a dedicated control channel (DCCH). The BCCH is a downlink channel for broadcasting system control information. The PCCH is a downlink channel that transfers paging information and is used when the network does not know the location cell of a UE. The CCCH is used by UEs having no RRC connection with the network. The MCCH is a point-to-multipoint downlink channel used for transmitting MBMS control information from the network to a UE. The DCCH is a point-to-point bi-directional channel used by UEs having an RRC connection that transmits dedicated control information between a UE and the network.

Traffic channels are used for the transfer of user plane information only. The traffic channels provided by MAC include a dedicated traffic channel (DTCH) and a multicast traffic channel (MTCH). The DTCH is a point-to-point channel, dedicated to one UE for the transfer of user information and can exist in both uplink and downlink. The MTCH is a point-to-multipoint downlink channel for transmitting traffic data from the network to the UE.

Uplink connections between logical channels and transport channels include a DCCH that can be mapped to UL-SCH, a DTCH that can be mapped to UL-SCH and a CCCH that can be mapped to UL-SCH. Downlink connections between logical channels and transport channels include a BCCH that can be mapped to BCH or DL-SCH, a PCCH that can be mapped to PCH, a DCCH that can be mapped to DL-SCH, and a DTCH that can be mapped to DL-SCH, a MCCH that can be mapped to MCH, and a MTCH that can be mapped to MCH.

The specification of a home eNB (HeNB) is currently ongoing in 3GPP LTE. It may be referred to Paragraph 4.6.1 of "Technical Specification Group Radio Access Network; Evolved Universal Terrestrial Radio Access (E-UTRA); and Evolved Universal Terrestrial Radio Access Network (E-UTRAN); Overall description; Stage 2 (release 9)" to 3GPP (3rd generation partnership project) TS 36.300 V10.2.0 (2010-12). The HeNB is a small base station designed for use in residential or small business environment. The HeNB may be a femto cell or a pico cell. The HeNB is short range about tens of meter, installed by the consumer for better indoor voice and data reception.

FIG. 5 shows logical architecture of an E-UTRAN HeNB.

Referring to FIG. 5, a HeNB 50 may be connected with an EPC 60 through an S1 interface. A HeNB gateway (55, HeNB GW) may be deployed between the HeNB 50 and the EPC 60 to allow the S1 interface and to scale to support a large number of HeNBs. The HeNB GW 55 serves as a concentrator for the C(control)-Plane, specifically the S1-MME interface. The S1-U interface from the HeNB 50 may be terminated at the HeNB GW 55, or a direct logical U(user)-Plane connection between HeNB 50 and S-GW 56 may be used. The S1 interface may be defined as the interface between the HeNB GW 55 and the core network, between the HeNB 50 and the HeNB GW 55, between the HeNB 50 and the core network, and between the eNB and the core network. Also, the HeNB GW 55 appears to the MME as an eNB. The HeNB GW 55 appears to the HeNB as an MME. The S1 interface between the HeNB 50 and the EPC 60 is the same whether the HeNB 50 is connected to the EPC 60 via a HeNB GW 55 or not.

FIG. 6 shows overall architecture with deployed HeNB GW.

Referring to FIG. 6, an E-UTRAN may include one or more eNB 60, one or more HeNB 70 and a HeNB GW 79. One or more E-UTRAN MME/S-GW 69 may be positioned at the end of the network and connected to an external network. The one or more eNB 60 may be connected to each other through the X2 interface. The one or more eNB 60 may be connected to the MME/S-GW 69 through the S1 interface. The HeNB GW 79 may be connected to the MME/S-GW 69 through the S1 interface. The one or more HeNB 70 may be connected to the HeNB GW 79 through the S1 interface or may be connected to the MME/S-GW 69 through the S1 interface. Or, the one or more HeNB 70 may be connected to the MME/S-GW 69 through the S5 interface. The one or more HeNB 70 may be connected to each other through the X2 interface. In this case, the one or more HeNB 70 have same closed subscriber group (CSG) IDs. That is, the X2 interface may be established between the HeNBs having the same CSG IDs. If the X2 interface between HeNBs exists, a X2-based handover procedure may be performed through the X2 interface.

Lately, the X2 interface between a macro eNB and a HeNB has been discussed in a future release of 3GPP LTE. The macro eNB and the HeNB may be connected with a direct X2 interface or an indirect X2 interface. For establishing the direct X2 interface or the indirect X2 interface, there is need to know a transport network layer (TNL) address of the macro eNB and/or the HeNB. If the eNB is aware of an eNB ID of the candidate eNB (e.g. via the automatic neighbor relation (ANR) function) but not a TNL address suitable for a stream control transmission protocol (SCTP) connectivity, then the eNB may utilize a configuration transfer function to determine the TNL address. The TNL address to be obtained may depend on the direct X2 interface or the indirect X2 interface between the macro eNB and the HeNB.

Accordingly, a method to make sure that the TNL address discovery procedure works well is required.

SUMMARY OF INVENTION

Technical Problem

The present invention provides a method and apparatus for initiating an X2 interface setup in a wireless communication system. The present invention provides a TNL address discovery procedure when initiating an X2 interface setup between a macro eNB and a HeNB. The present invention also provides a method of notifying a HeNB GW/X2-proxy that the actual X2 interface to be set up is whether a direct X2 interface or an indirect X2 interface.

Solution to Problem

In an aspect, a method for transmitting, by a home eNodeB (HeNB)/X2-proxy, a transport network layer (TNL) address in a wireless communication system is provided. The method includes receiving a mobility management entity (MME) configuration transfer message from a MME, the MME configuration transfer message including an indication whether a direct X2 interface or an indirect X2 interface is to be established between a macro eNB and a HeNB, the indication being generated by the macro eNB, forwarding the MME configuration transfer message to the HeNB, receiving an eNB configuration transfer message from the HeNB, the eNB configuration transfer message including a transport network layer (TNL) address of the HeNB and an identifier (ID) of the HeNB; and on receiving the eNB configuration transfer message from the HeNB, determining a TNL address and an ID to be transmitted to the MME in the eNB configuration transfer message based on the indication whether the direct X2 interface or the indirect X2 interface is to be established between the macro eNB and the HeNB.

The method may further include transmitting the modified eNB configuration transfer message to the MME if the indication indicates that the indirect X2 interface is to be established between the macro eNB and the HeNB, the modified eNB configuration transfer message including a TNL address of the HeNB GW/X2-proxy and an eNB ID of the HeNB GW/X2-proxy instead of a TNL address of the HeNB and an eNB ID of the HeNB.

The method may further include forwarding the eNB configuration transfer message to the MME if the indication indicates that the direct X2 interface is to be established between the macro eNB and the HeNB, the eNB configuration transfer message including a TNL address of the HeNB and an eNB ID of the HeNB.

The MME configuration transfer message may include an ID of the macro eNB, a tracking area identifier (TAI) of the macro eNB, an ID of the HeNB, a TAI of the HeNB and a self-organizing network (SON) information request.

The method may further include assisting for the macro eNB to initiate the X2 interface setup if the indication indicates that the indirect X2 interface is to be established between the macro eNB and the HeNB.

The method may further include the macro eNB initiates the X2 interface setup with the HeNB if the indication indicates that the direct X2 interface is to be established between the macro eNB and the HeNB.

In another aspect, a method for transmitting, by a home eNodeB (HeNB)/X2-proxy, a transport network layer (TNL) address in a wireless communication system is provided. The method includes receiving a eNB configuration transfer message from a HeNB, forwarding the eNB configuration transfer message to the MME, receiving a mobility management entity (MME) configuration transfer message from the MME, the MME configuration transfer message including an indication whether a direct X2 interface or an indirect X2 interface is to be established between a macro eNB and a HeNB, and the MME configuration transfer message including a transport network layer (TNL) address of the macro eNB and an identifier (ID) of the macro eNB, the indication being generated by the macro eNB, and on receiving the MME configuration transfer message from the MME, determining a TNL address and an eNB ID to be transmitted to the HeNB in the MME configuration transfer message based on the indication whether the direct X2 interface or the indirect X2 interface is to be established between the macro eNB and the HeNB.

The method may further include transmitting the modified MME configuration transfer message to the HeNB if the indication indicates that the indirect X2 interface is to be established between the macro eNB and the HeNB, the modified MME configuration transfer message including a TNL address of the HeNB GW/X2-proxy and an ID of the HeNB GW/X2-proxy instead of a TNL address of the macro eNB and an ID of the macro eNB.

The method may further include forwarding the MME configuration transfer message to the HeNB if the indication indicates that the direct X2 interface is to be established between the macro eNB and the HeNB, the MME configuration transfer message including a TNL address of the macro eNB and an ID of the macro eNB.

The eNB configuration transfer message may include an ID of the macro eNB, a tracking area identifier (TAI) of the macro eNB, an ID of the HeNB, a TAI of the HeNB and a self-organizing network (SON) information request.

The method may further include initiating the X2 interface setup with the HeNB if the indication indicates that the indirect X2 interface is to be established between the macro eNB and the HeNB.

The method may further include the HeNB initiates the X2 interface setup with the macro eNB if the indication indicates that the direct X2 interface is to be established between the macro eNB and the HeNB.

In another aspect, a method for transmitting, by a home eNodeB (HeNB)/X2-proxy, a transport network layer (TNL) address in a wireless communication system is provided. The method includes receiving a mobility management entity (MME) configuration transfer message from a MME, forwarding the MME configuration transfer message to the HeNB, receiving an eNB configuration transfer message from the HeNB, the eNB configuration transfer message including a transport network layer (TNL) address of the HeNB and an identifier (ID) of the HeNB, on receiving the eNB configuration transfer message from the HeNB, modifying the TNL address of the HeNB and the eNB ID of the HeNB in the eNB configuration transfer message into a TNL address of the HeNB GW/X2-proxy and an eNB ID of the HeNB GW/X2-proxy, transmitting the modified eNB configuration transfer message to the MME, and initiating the X2 interface setup with the macro eNB in case that the HeNB discovers the macro eNB.

The MME configuration transfer message may include an ID of the macro eNB, a tracking area identifier (TAI) of the macro eNB, an ID of the HeNB, a TAI of the HeNB and a self-organizing network (SON) information request.

Advantageous Effects of Invention

A TNL address discovery procedure can be effectively performed when initiating an X2 interface setup between a macro eNB and a HeNB

MODE FOR THE INVENTION

The technology described below can be used in various wireless communication systems such as code division multiple access (CDMA), frequency division multiple access (FDMA), time division multiple access (TDMA), orthogonal frequency division multiple access (OFDMA), single carrier frequency division multiple access (SC-FDMA), etc. The CDMA can be implemented with a radio technology such as universal terrestrial radio access (UTRA) or CDMA-2000. The TDMA can be implemented with a radio technology such as global system for mobile communications (GSM)/general packet ratio service (GPRS)/enhanced data rate for GSM evolution (EDGE). The OFDMA can be implemented with a radio technology such as institute of electrical and electronics engineers (IEEE) 802.11 (Wi-Fi), IEEE 802.16 (WiMAX), IEEE 802-20, evolved UTRA (E-UTRA), etc. IEEE 802.16m is an evolution of IEEE 802.16e, and provides backward compatibility with an IEEE 802.16-based system. The UTRA is a part of a universal mobile telecommunication system (UMTS). 3rd generation partnership project (3GPP) long term evolution (LTE) is a part of an evolved UMTS (E-UMTS) using the E-UTRA. The 3GPP LTE uses the OFDMA in downlink and uses the SC-FDMA in uplink. LTE-advance (LTE-A) is an evolution of the 3GPP LTE.

For clarity, the following description will focus on the LTE-A. However, technical features of the present invention are not limited thereto.

Figure 1:
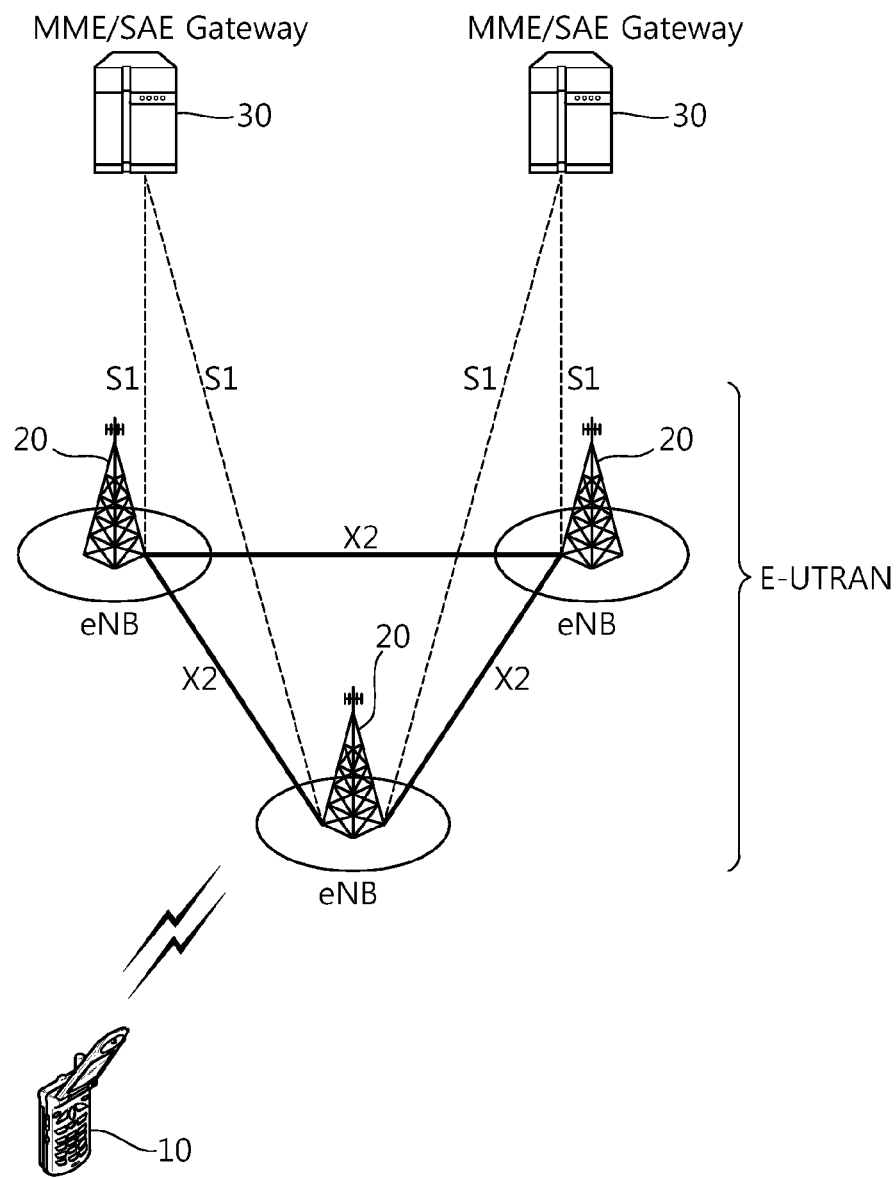
FIG. 1 shows network structure of an evolved universal mobile telecommunication system (E-UMTS).
Figure 2:
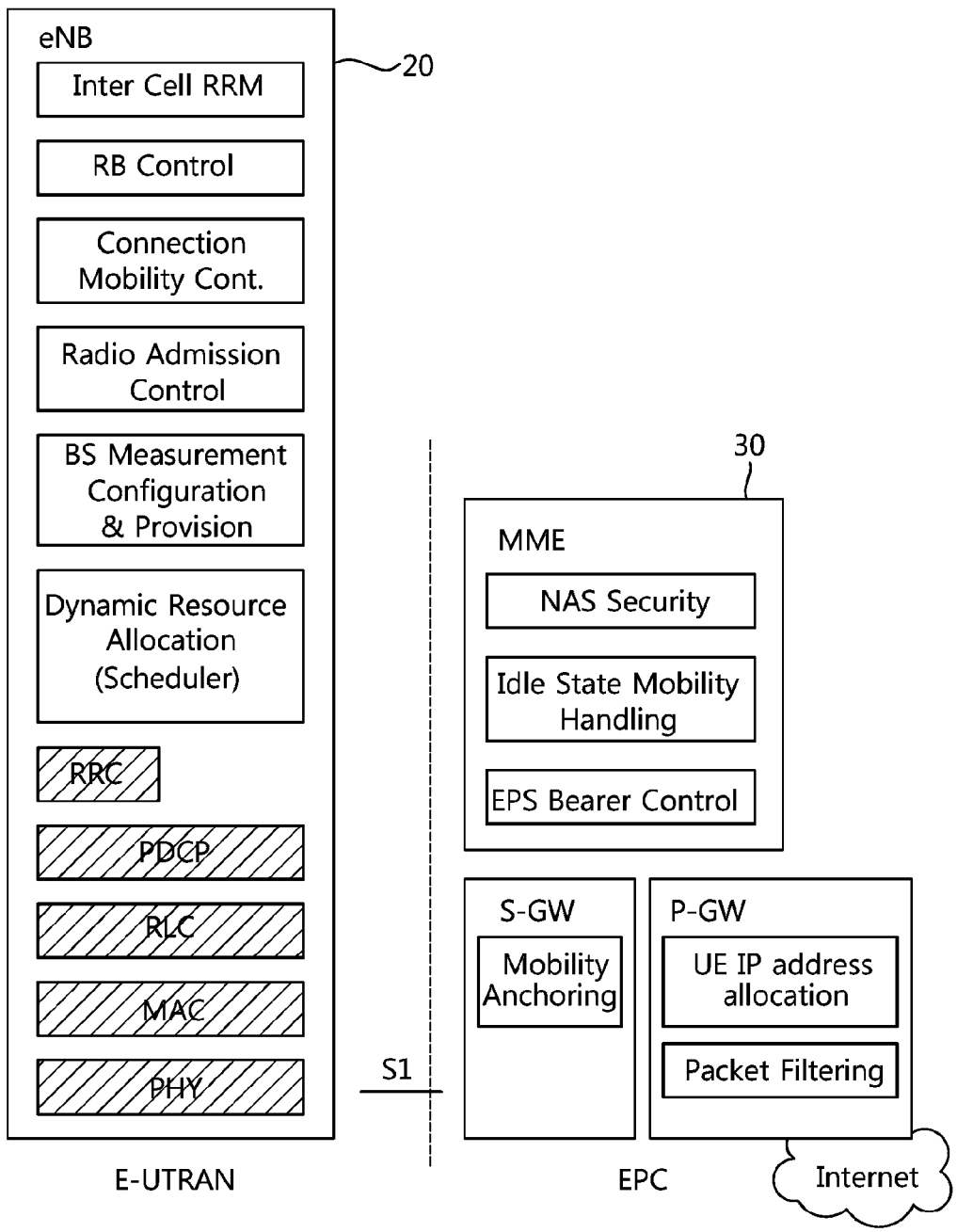
FIG. 2 shows architecture of a typical E-UTRAN and a typical EPC.
Figure 3:
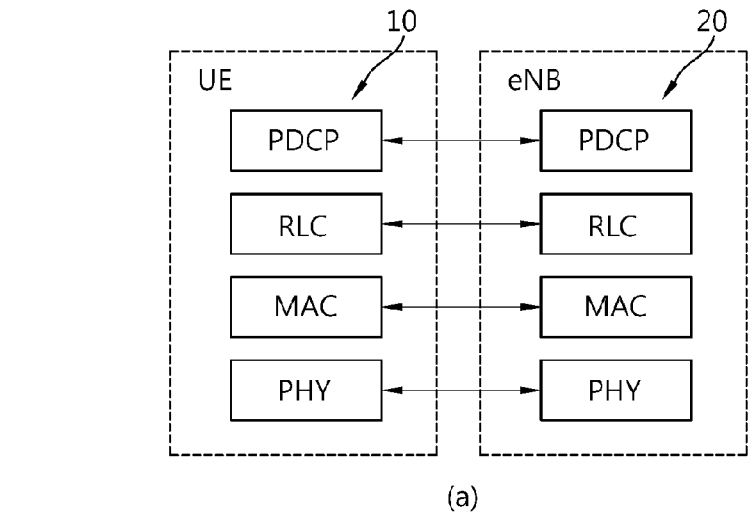
FIG. 3 shows a user-plane protocol and a control-plane protocol stack for the E-UMTS.
Figure 3:
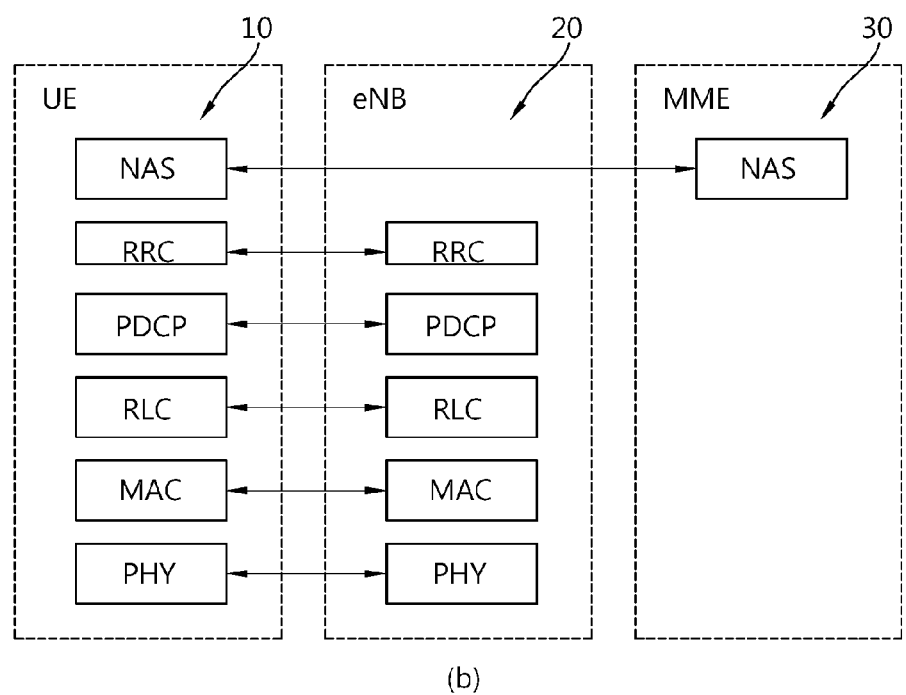
Figure 4:
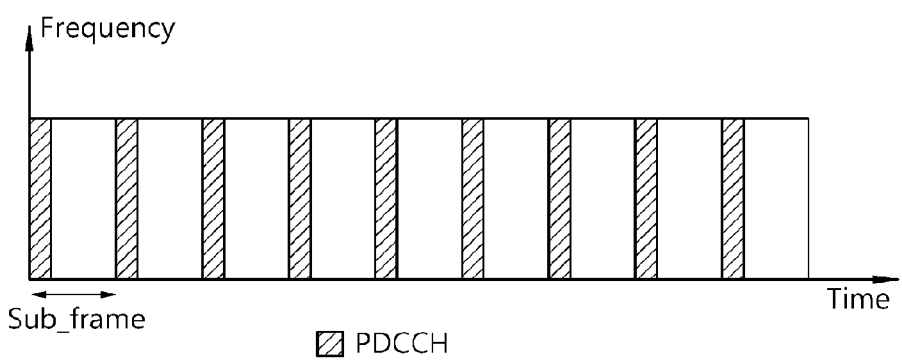
FIG. 4 shows an example of structure of a physical channel.
Figure 5:
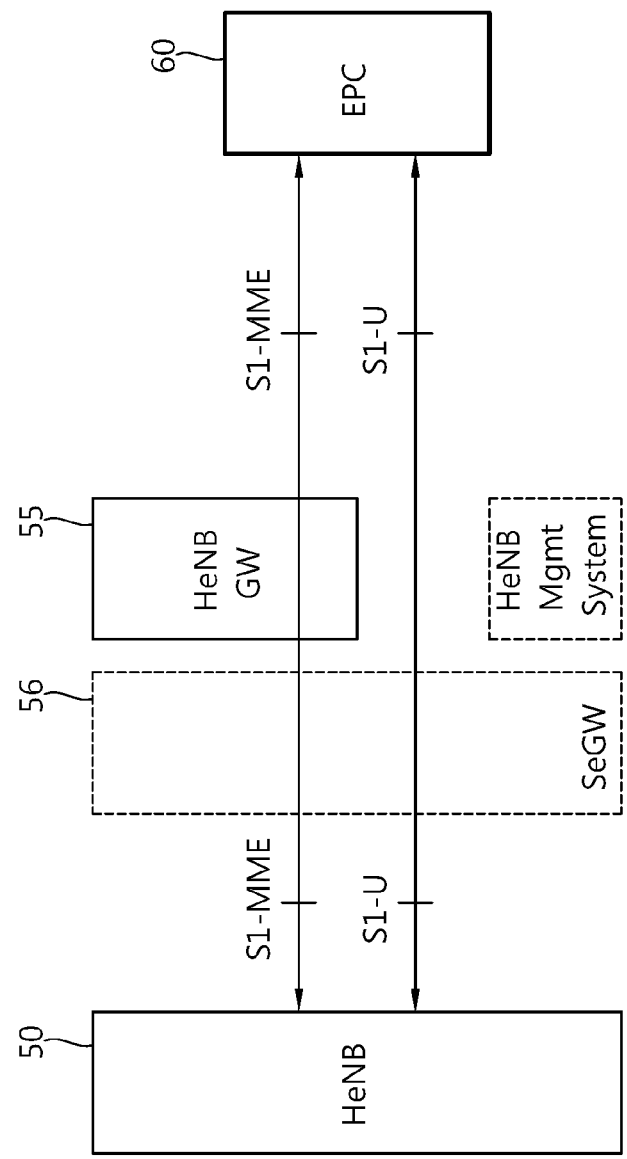
FIG. 5 shows logical architecture of an E-UTRAN HeNB.
Figure 6:
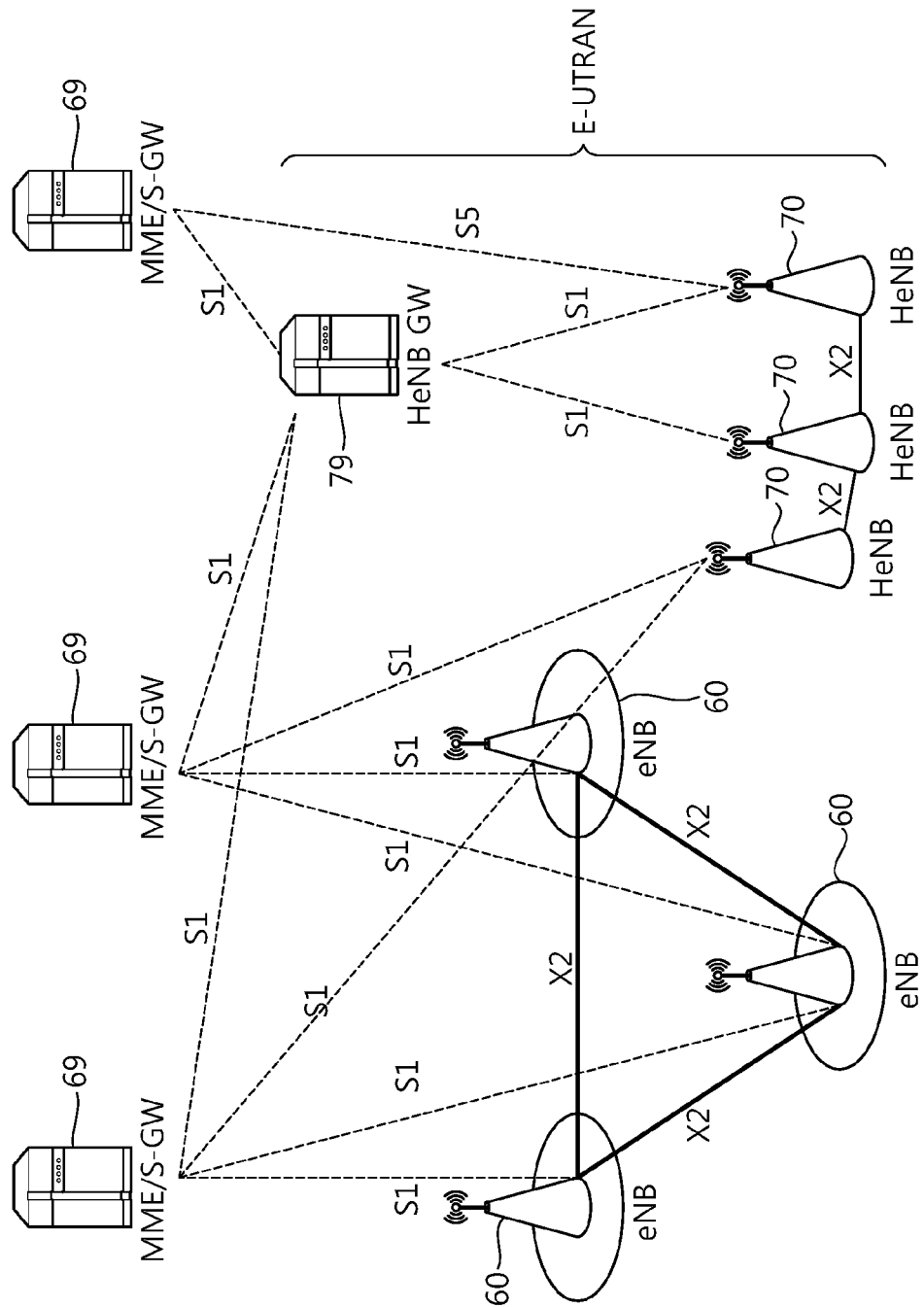
FIG. 6 shows overall architecture with deployed HeNB GW.
Figure 7:
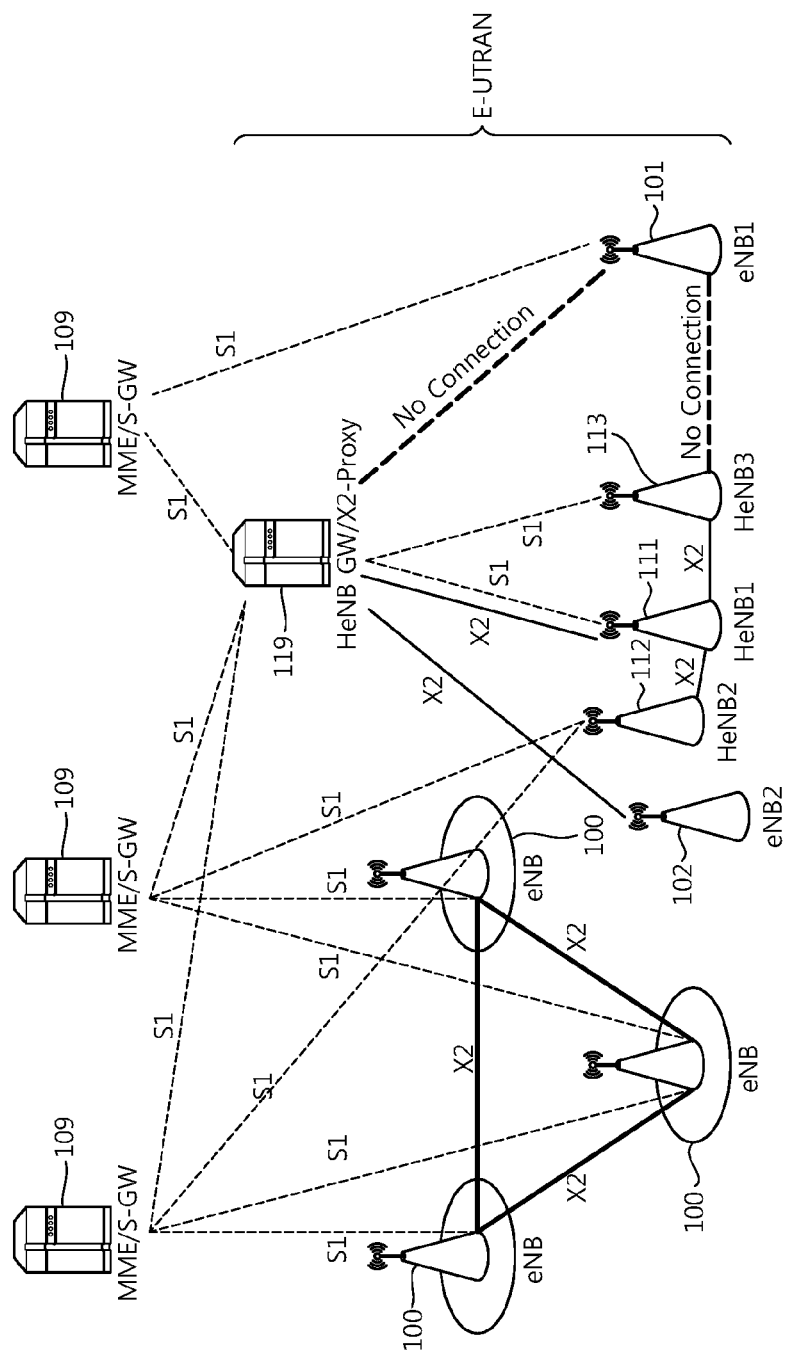
FIG. 7 shows an example of overall E-UTRAN architecture with deployed HeNB GW/X2-proxy

FIG. 7 shows an example of overall E-UTRAN architecture with deployed HeNB GW/X2-proxy Referring to FIG. 7, an E-UTRAN may include one or more eNB 100, a macro eNB1 101, a macro eNB2 102, a HeNB1 111, a HeNB2 112, a HeNB3 113 and a HeNB GW/X2-proxy 119. One or more E-UTRAN MME/S-GW 109 may be positioned at the end of the network and connected to an external network. The eNBs 100 may be connected to each other through the X2 interface. The eNBs 100 may be connected to the MME/S-GW 109 through the S1 interface. The HeNB GW/X2-proxy 119 may be connected to the MME/S-GW 109 through the S1 interface. The HeNB1 111 and the HeNB3 113 may be connected to the HeNB GW/X2-proxy 119 through the S1 interface. The HeNB2 112 may be connected to the MME/S-GW 109 through the S1 interface. The HeNBs 111, 112, 113 may be connected to each other through the direct X2 interface. In this case, the HeNBs 111, 112, 113 may have same CSG IDs in the 3GPP LTE rel-10 and they may have different CSG in the 3GPP LTE rel-11. The macro eNB1 101 may be connected to the MME/S-GW 109 through the S1 interface.

Referring to FIG. 7, the X2 interface may be introduced between the macro eNB and the HeNB. There exist two possible connections. At first, the macro eNB and the HeNB may be connected by going through HeNB GW/X2-proxy indirectly. In FIG. 7, the macro eNB2 102 and the HeNB1 111 may be connected through the indirect X2 interface by going through the HeNB GW/X2-proxy 119. Or, the macro eNB and the HeNB may be connected each other directly. Based on the structure above, an X2 handover may be preceded more quickly between the macro eNB and the HeNB.

In FIG. 7, the X2 interface between the macro eNB1 101 and the HeNB3 113 is not established. That is, whether the direct X2 interface or the indirect X2 interface going through the HeNB GW/X2-Proxy 119 has not been set up.

For setting up the direct X2 interface or the indirect X2 interface between the macro eNB1 101 and the HeNB3 113, a procedure for discovering a transport network layer (TNL) address of HeNB GW/X2-proxy or a TNL address of (H)eNB is needed. If the eNB is aware of an eNB ID of the candidate eNB (e.g. via the automatic neighbor relation (ANR) function) but not a TNL address suitable for a stream control transmission protocol (SCTP) connectivity, then the eNB may utilize a configuration transfer function to determine the TNL address. The eNB may transmits an eNB configuration transfer message to the MME to request the TNL address of the candidate eNB, and includes relevant information such as the source and target eNB ID. The MME relays the request by transmitting ending the MME configuration transfer message to the candidate eNB identified by the target eNB ID. The candidate eNB responds by transmitting the eNB configuration transfer message containing one or more TNL addresses to be used for SCTP connectivity with the initiating eNB, and includes other relevant information such as the source and target eNB ID. The MME relays the response by transmitting the MME configuration transfer message to the initiating eNB identified by the target eNB ID.

Figure 8:
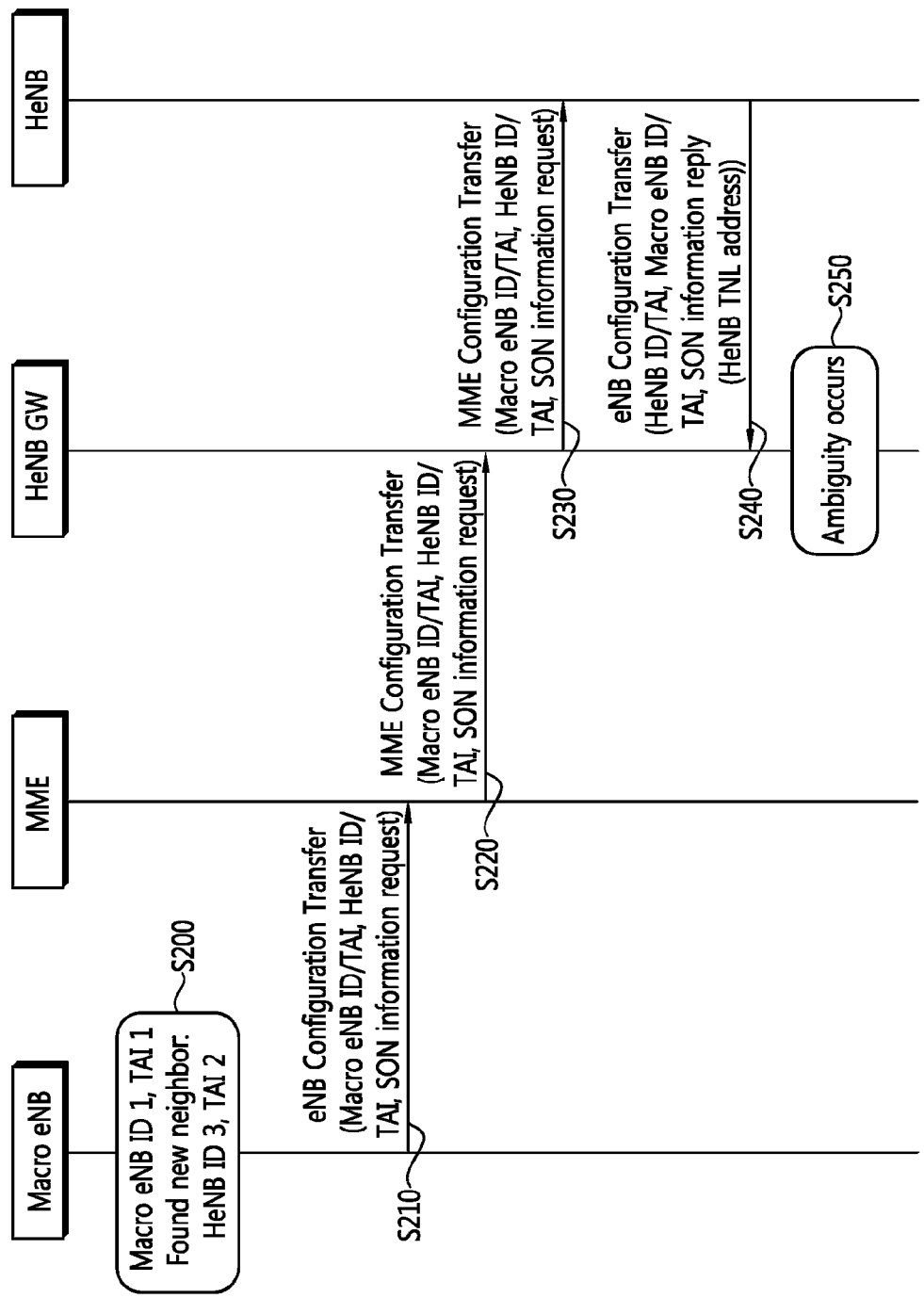
FIG. 8 shows an example of the procedure for discovering a TNL address for the X2 interface setup between a macro eNB and a HeNB.

FIG. 8 shows an example of the procedure for discovering a TNL address for the X2 interface setup between a macro eNB and a HeNB.

Referring to FIG. 8, the macro eNB finds the new HeNB in step S200. The macro eNB has an identifier (ID) 1 and a tracking area identifier (TAI) 1. The HeNB has ID 3 and TAI 2. In this example, it is assumed that the macro eNB1 101 in FIG. 7 discovers the HeNB3 113 FIG. 7 through a UE ANR report about HeNB3 113 cell. At receiving the UE ANR report, the macro eNB1 101 would initiate TNL address discovery procedure in order to get the TNL address of the HeNB GW/X2-proxy 119 or the HeNB3 113, which is the necessary condition for the X2 interface setup.

In step S210, the macro eNB transmits a first eNB configuration transfer message to the MME. The configuration transfer function is a generic mechanism that allows the request and transfer of radio access network (RAN) configuration information (e.g. self-organizing network (SON) information) between two RAN nodes via the core network. The first eNB configuration transfer message may contain the macro eNB ID/TAI, the HeNB ID/TAI and a SON information request. In step S220, the MME transmits a first MME configuration transfer message to HeNB GW. The first MME configuration transfer message may contain the same information as the first eNB configuration transfer message. In the two messages, the source and target eNB IDs are the macro eNB ID and the HeNB ID, respectively. In step S230, the HeNB GW forwards the first MME configuration transfer message to the HeNB.

In step S240, the HeNB transmits a second eNB configuration transfer message to the HeNB GW. The HeNB replies back its TNL address to the HeNB GW by using the second eNB configuration transfer message.

From the point of view of the macro eNB, the macro eNB knows that the X2 interface setup will be done whether between itself and the HeNB GW indirectly or between itself and the HeNB3 directly. However, The HeNB GW doesn't know it. Thus, when receiving the second eNB configuration transfer message from the HeNB, it is hard for HeNB GW to make a decision about the TNL address. Accordingly, an ambiguity occurs in step S250. That is, the HeNB GW needs to know whether the TNL address of itself or the TNL address of HeNB should be replied back to the macro eNB1. Also, the source ID in the second eNB configuration transfer message or the second MME configuration transfer message should be decided depending on which X2 interface is established. That is, the source ID in the second eNB configuration transfer message or the second MME configuration transfer message may be different according to the actual X2 interface whether between the HeNB GW and the macro eNB or between the HeNB and the Macro eNB.

Likewise, there is another scenario that the HeNB discovers the macro eNB through a UE ANR report about the macro eNB cell. At receiving the UE ANR report, the HeNB would initiate the TNL address discovery procedure in order to get the TNL address of the macro eNB1, which is the necessary condition for the X2 interface setup. Similar problem described above exists since two X2 interface setup choices are available.

Meanwhile, it is possible that the direct X2 interface between the macro eNB and the HeNB is not allowed. Thus, only the indirect X2 interface going through the HeNB GW/X2-proxy is available. In this scenario, some problem still may happen due to the existing of the HeNB GW/X2-proxy.

To solve the problem described above, it is important to notify HeNB GW/X2-proxy that which X2 interface is established between the macro eNB and the HeNB. Also for the case where the direct X2 interface between the macro eNB and the HeNB is not available, the behavior of the HeNB GW/X2-proxy needs to be defined.

Figure 9:
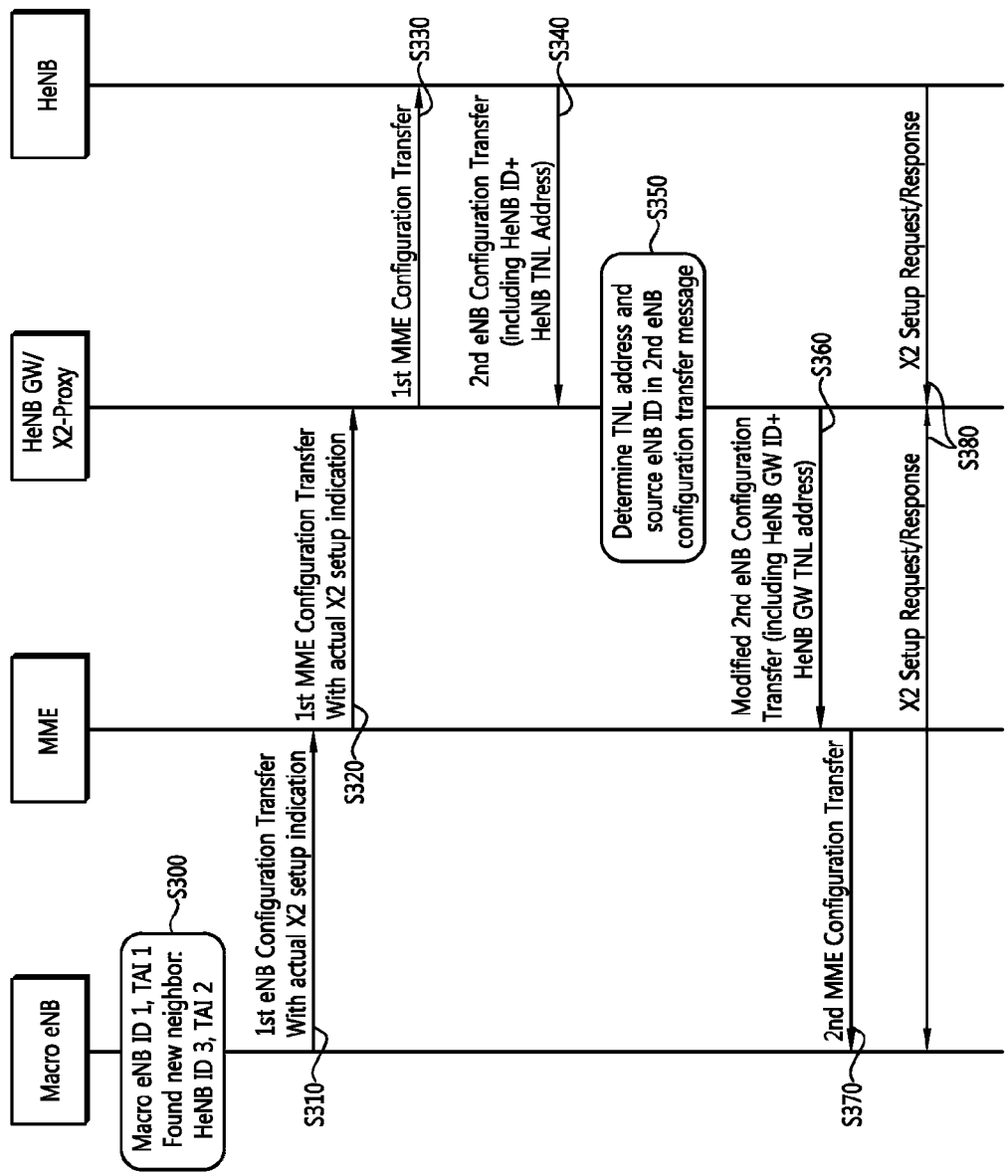
FIG. 9 shows an example of the procedure for discovering a TNL address for the X2 interface setup between a macro eNB and a HeNB according to an embodiment of the present invention.

FIG. 9 shows an example of the procedure for discovering a TNL address for the X2 interface setup between a macro eNB and a HeNB according to an embodiment of the present invention.

Referring to FIG. 9, in step S300, the macro eNB finds the new HeNB which supports one of three modes (open mode, hybrid mode or closed mode). It is assumes that the macro eNB has an ID 1 and a TAI 1 and the HeNB has ID 3 and TAI 2. At receiving the UE ANR report, the macro eNB would initiate TNL address discovery procedure in order to get the TNL address of HeNB GW/X2-proxy or the HeNB.

In step S310, the macro eNB transmits a first eNB configuration transfer message to the MME. The first eNB configuration transfer message may contain the macro eNB ID/TAI, the HeNB ID/TAI and a SON information request. In addition, the first eNB configuration transfer message may contain an indication of the actual X2 interface to be set up between the macro eNB and the HeNB. That is, the first eNB configuration transfer message includes the indication whether the direct X2 interface between the macro eNB and the HeNB or the indirect X2 interface going through the HeNB GW/X2-proxy is to be established.

In step S320, the MME transmits a first MME configuration transfer message to the HeNB GW/X2-proxy. The first MME configuration transfer message may contain the same information as the first eNB configuration transfer message. In addition, the first MME configuration transfer message may contain an indication of the actual X2 interface to be set up between the macro eNB and the HeNB. That is, the first MME configuration transfer message includes the indication whether the direct X2 interface between the macro eNB and the HeNB or the indirect X2 interface going through the HeNB GW/X2-proxy is to be established. In step S330, the HeNB GW/X2-proxy forwards the first MME configuration transfer message to the HeNB.

In step S340, the HeNB transmits a second eNB configuration transfer message to the HeNB GW/X2-proxy. The HeNB replies back its TNL address to the HeNB GW/X2-proxy by using the second eNB configuration transfer message.

In step S350, the HeNB GW/X2-proxy determines which TNL address and source eNB ID are to be transmitted to the macro eNB based on the indication of the actual X2 interface to be set up between the macro eNB and the HeNB. That is, with the indication, the HeNB GW/X2-Proxy decides the TNL address (whether the TNL address of itself or the TNL address of the HeNB) and source eNB ID (whether the eNB ID of itself or the eNB ID of the HeNB).

If the indication of the actual X2 interface to be set up between the macro eNB and the HeNB indicates that the indirect X2 interface is to be established between the macro eNB and the HeNB, HeNB GW/X2-proxy uses the TNL address of itself and the eNB ID of itself. That is, the HeNB GW/X2-proxy cannot just forward the second eNB configuration transfer message received from the HeNB to the MME. The HeNB GW/X2-proxy modifies the TNL address and the source eNB ID in the second eNB configuration transfer message to the TNL address of the HeNB GW/X2-proxy and the eNB ID of the HeNB GW/X2-proxy. For this example, the case of indirect X2 interface between the macro eNB and the HeNB is assumed, and in step S360, the HeNB GW/X2-proxy transmits modified second eNB configuration transfer message to the MME.

If the indication of the actual X2 interface to be set up between the macro eNB and the HeNB indicates that the direct X2 interface is to be established between the macro eNB and the HeNB, HeNB GW/X2-Proxy uses the TNL address of the HeNB and the eNB ID of the HeNB. That is, the HeNB GW/X2-Proxy just forwards the second eNB configuration transfer message to the MME after it receives the reply from the HeNB.

In step S370, the MME transmits a second MME configuration transfer message to the macro eNB. The second MME configuration transfer message may contain the same information as the second eNB configuration transfer message. For this example, the second MME configuration transfer message may include the TNL address of the HeNB GW/X2-proxy and the ID of the HeNB GW/X2-proxy. Or, in case of direct X2 interface between the macro eNB and the HeNB, the second MME configuration transfer message may include the TNL address of the HeNB and the ID of the HeNB.

In step S380, the macro eNB initiates the X2 interface setup. In case of the indirect X2 interface between the macro eNB and the HeNB, the macro eNB initiate the X2 interface setup towards the HeNB GW/X2-proxy. In case of the direct X2 interface between the macro eNB and the HeNB, the macro eNB initiate the X2 interface setup towards the HeNB.

Figure 10:
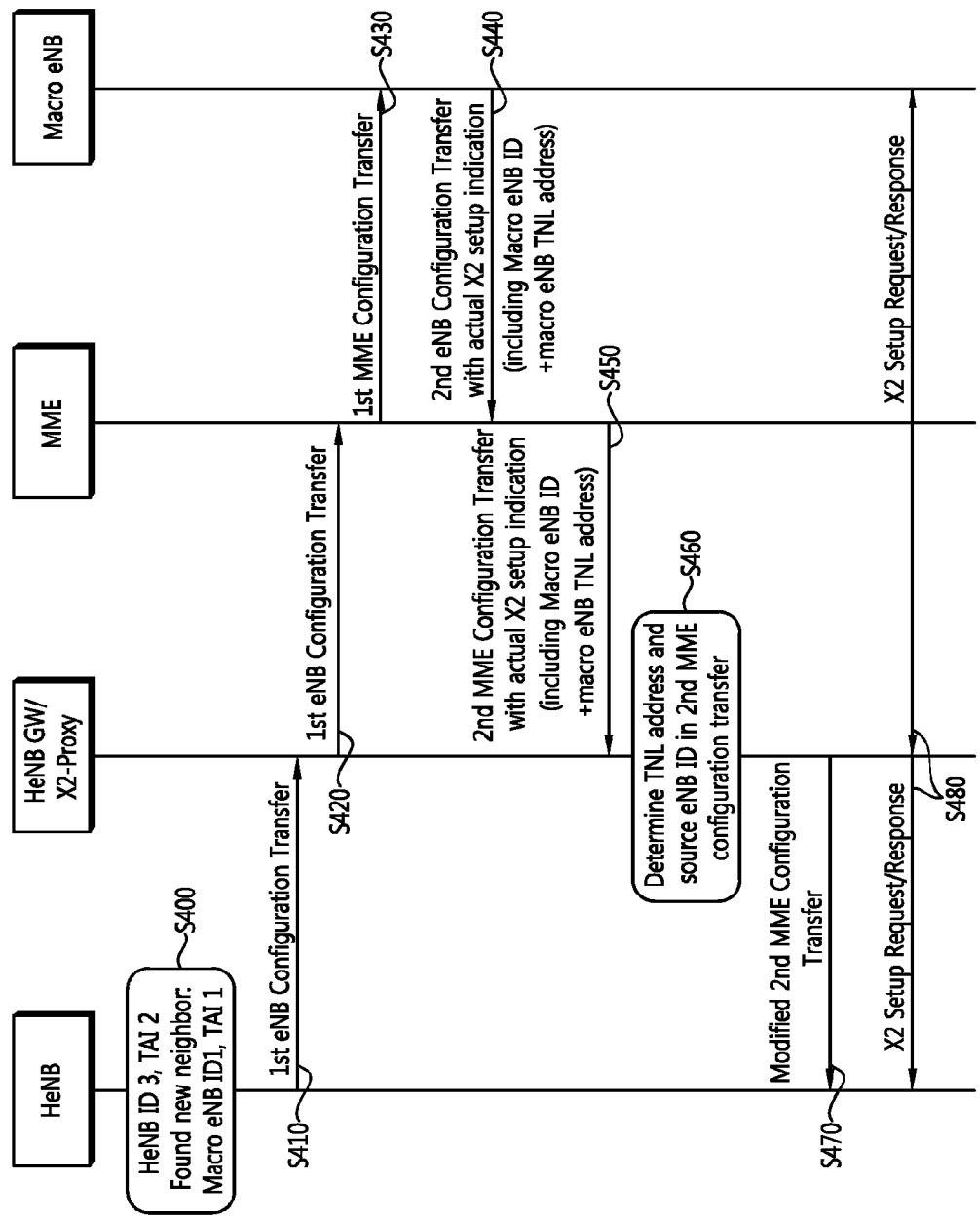
FIG. 10 shows an example of the procedure for discovering a TNL address for the X2 interface setup between a macro eNB and a HeNB according to an embodiment of the present invention.

FIG. 10 shows an example of the procedure for discovering a TNL address for the X2 interface setup between a macro eNB and a HeNB according to an embodiment of the present invention.

Referring to FIG. 10, in step S400, the HeNB finds the new macro eNB. It is assumes that the HeNB has ID 3 and TAI 2, and the macro eNB has an ID 1 and a TAI 1. At receiving the UE ANR report, the HeNB would initiate TNL address discovery procedure in order to get the TNL address of HeNB GW/X2-proxy or the macro eNB.

In step S410, the HeNB transmits a first eNB configuration transfer message to the HeNB GW/X2-proxy. The first eNB configuration transfer message may contain the HeNB ID/TAI, the macro eNB ID/TAI and a SON information request. In step S420, the HeNB GW/X2-proxy forwards the first eNB configuration transfer message to the MME. In step S430, the MME transmits a first MME configuration transfer message to the macro eNB. The first MME configuration transfer message may contain the same information as the first eNB configuration transfer message.

In step S440, the macro eNB transmits a second eNB configuration transfer message to the MME. The macro eNB replies back its TNL address to the MME by using the second eNB configuration transfer message. In addition, the second eNB configuration transfer message may contain an indication of the actual X2 interface to be set up between the HeNB and the macro eNB. That is, the second eNB configuration transfer message includes the indication whether the direct X2 interface between the HeNB and the macro eNB or the indirect X2 interface going through the HeNB GW/X2-proxy is to be established.

In step S450, the MME transmits a second MME configuration transfer message to the HeNB GW/X2-proxy. The second MME configuration transfer message may contain the same information as the second eNB configuration transfer message. In addition, the second MME configuration transfer message may contain an indication of the actual X2 interface to be set up between the HeNB and the macro eNB. That is, the second MME configuration transfer message includes the indication whether the direct X2 interface between the HeNB and the macro eNB or the indirect X2 interface going through the HeNB GW/X2-proxy is to be established.

In step S460, the HeNB GW/X2-proxy determines which TNL address and source eNB ID are transmitted to the HeNB based on the indication of the actual X2 interface to be set up between the HeNB and the macro eNB. That is, with the indication, the HeNB GW/X2-Proxy decides the TNL address (whether the TNL address of itself or the TNL address of the macro eNB) and source eNB ID (whether the eNB ID of itself or the eNB ID of the macro eNB).

If the indication of the actual X2 interface to be set up between the HeNB and the macro eNB indicates that the indirect X2 interface is to be established between the HeNB and the macro eNB, HeNB GW/X2-proxy uses the TNL address of itself and the eNB ID of itself. That is, the HeNB GW/X2-proxy cannot just forward the second MME configuration transfer message received from the MME to the HeNB. The HeNB GW/X2-proxy modifies the TNL address and the source eNB ID in the second MME configuration transfer message to the TNL address of the HeNB GW/X2-proxy and the eNB ID of the HeNB GW/X2-proxy. For this example, the case of indirect X2 interface between the HeNB and the macro eNB is assumed, and in step S470, the HeNB GW/X2-proxy transmits modified second MME configuration transfer message to the HeNB.

If the indication of the actual X2 interface to be set up between the HeNB and the macro eNB indicates that the direct X2 interface is to be established between the HeNB and the macro eNB, HeNB GW/X2-Proxy uses the TNL address of the macro eNB and the eNB ID of the macro eNB. That is, the HeNB GW/X2-Proxy just forwards the second MME configuration transfer message to the HeNB after it receives the reply from the macro eNB.

In step S470, the MME transmits the modified second MME configuration transfer message to the HeNB. The modified second MME configuration transfer message includes the TNL address of the HeNB GW/X2-proxy and the ID of the HeNB GW/X2-proxy.

In step S480, the HeNB initiates the X2 interface setup. In case of the indirect X2 interface between the HeNB and the macro eNB, the HeNB initiate the X2 interface setup towards the HeNB GW/X2-proxy. In case of the direct X2 interface between the HeNB and the macro eNB, the HeNB initiate the X2 interface setup towards the macro eNB.

Figure 11:
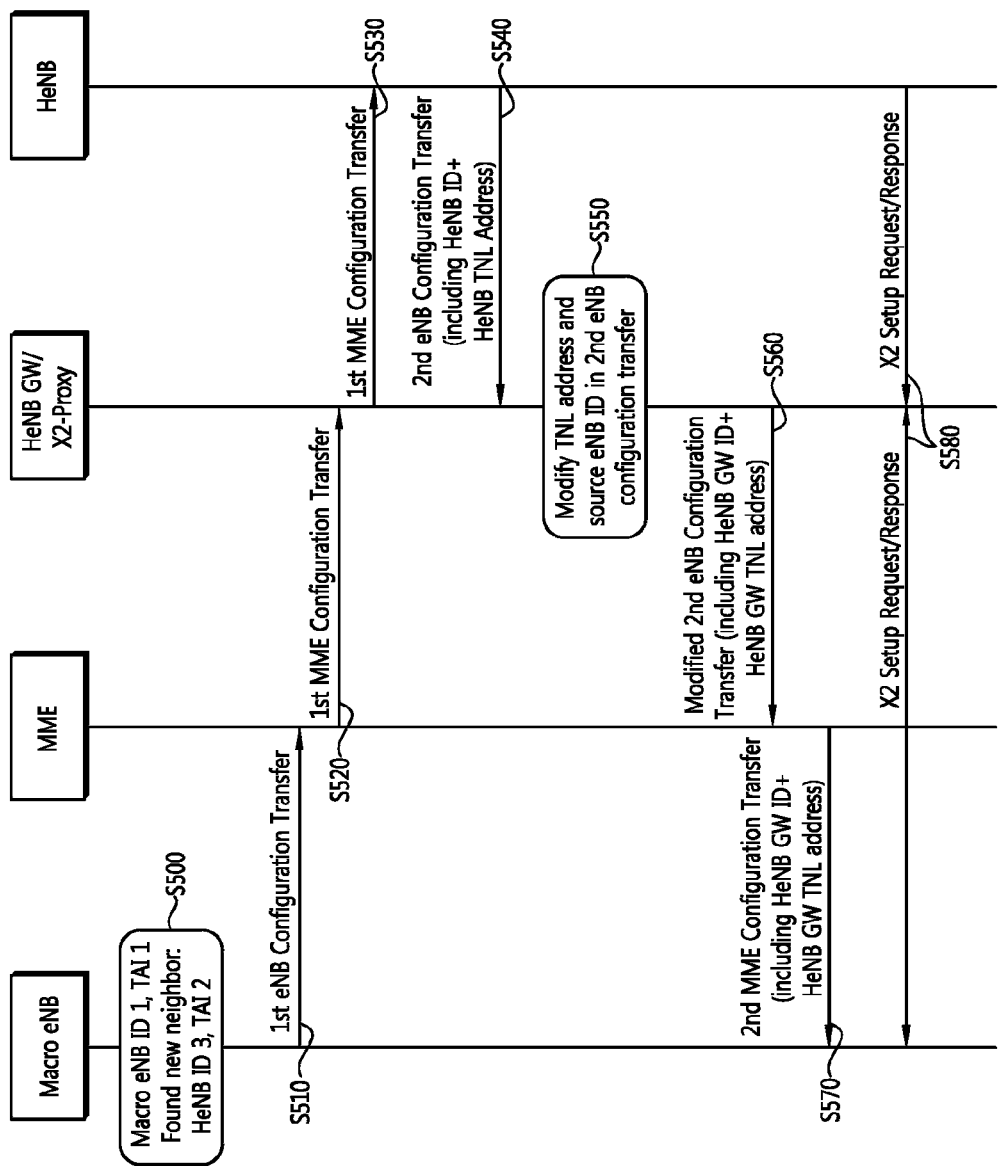
FIG. 11 shows an example of the procedure for discovering a TNL address for the X2 interface setup between a macro eNB and a HeNB according to an embodiment of the present invention.

FIG. 11 shows an example of the procedure for discovering a TNL address for the X2 interface setup between a macro eNB and a HeNB according to an embodiment of the present invention. FIG. 11 represents the case that only the indirect X2 interface between the macro eNB and the HeNB is available.

Referring to FIG. 11, in step S500, the macro eNB finds the new HeNB which supports one of the three modes (open mode, hybrid mode or closed mode). It is assumes that the macro eNB has an ID 1 and a TAI 1 and the HeNB has ID 3 and TAI 2. At receiving the UE ANR report, the macro eNB would initiate TNL address discovery procedure in order to get the TNL address of HeNB GW/X2-proxy.

In step S510, the macro eNB transmits a first eNB configuration transfer message to the MME. The first eNB configuration transfer message may contain the macro eNB ID/TAI, the HeNB ID/TAI and a SON information request. In step S520, the MME transmits a first MME configuration transfer message to the HeNB GW/X2-proxy. The first MME configuration transfer message may contain the same information as the first eNB configuration transfer message. In step S530, the HeNB GW/X2-proxy forwards the first MME configuration transfer message to the HeNB.

In step S540, the HeNB transmits a second eNB configuration transfer message to the HeNB GW/X2-proxy. The HeNB replies back its TNL address to the HeNB GW/X2-proxy by using the second eNB configuration transfer message.

HeNB GW/X2-proxy shall use the TNL address of itself and the eNB of itself. Accordingly, in step S550, the HeNB GW/X2-proxy modifies the TNL address and the source eNB ID in the second eNB configuration transfer message to the TNL address of the HeNB GW/X2-proxy and the eNB ID of the HeNB GW/X2-proxy. That is, the HeNB GW/X2-proxy cannot just forward the second eNB configuration transfer message received from the HeNB to the MME.

In step S560, the HeNB GW/X2-proxy transmits modified second eNB configuration transfer message to the MME.

In step S570, the MME transmits a second MME configuration transfer message to the macro eNB. The second MME configuration transfer message may contain the same information as the second eNB configuration transfer message. That is, the second MME configuration transfer message includes the TNL address of the HeNB GW/X2-proxy and the eNB ID of the HeNB GW/X2-proxy.

In step S580, the macro eNB initiates the X2 interface setup towards the HeNB GW/X2-proxy.

Figure 12:
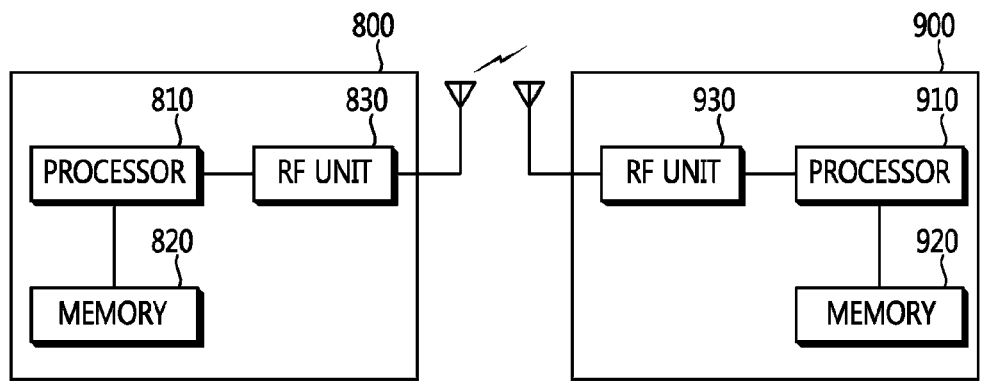
FIG. 12 is a block diagram showing wireless communication system to implement an embodiment of the present invention.

FIG. 12 is a block diagram showing wireless communication system to implement an embodiment of the present invention.

A HeNB GW/X2-proxy 800 includes a processor 810, a memory 820, and an RF (radio frequency) unit 830. The processor 810 may be configured to implement proposed functions, procedures, and/or methods in this description. Layers of the radio interface protocol may be implemented in the processor 810. The memory 820 is operatively coupled with the processor 810 and stores a variety of information to operate the processor 810. The RF unit 830 is operatively coupled with the processor 810, and transmits and/or receives a radio signal.

An eNB 900 may include a processor 910, a memory 920 and a RF unit 930. The processor 910 may be configured to implement proposed functions, procedures and/or methods described in this description. Layers of the radio interface protocol may be implemented in the processor 910. The memory 920 is operatively coupled with the processor 910 and stores a variety of information to operate the processor 910. The RF unit 930 is operatively coupled with the processor 910, and transmits and/or receives a radio signal.

The processors 810, 910 may include application-specific integrated circuit (ASIC), other chipset, logic circuit and/or data processing device. The memories 820, 920 may include read-only memory (ROM), random access memory (RAM), flash memory, memory card, storage medium and/or other storage device. The RF units 830, 930 may include baseband circuitry to process radio frequency signals. When the embodiments are implemented in software, the techniques described herein can be implemented with modules (e.g., procedures, functions, and so on) that perform the functions described herein. The modules can be stored in memories 820, 920 and executed by processors 810, 910. The memories 820, 920 can be implemented within the processors 810, 910 or external to the processors 810, 910 in which case those can be communicatively coupled to the processors 810, 910 via various means as is known in the art.

In view of the exemplary systems described herein, methodologies that may be implemented in accordance with the disclosed subject matter have been described with reference to several flow diagrams. While for purposed of simplicity, the methodologies are shown and described as a series of steps or blocks, it is to be understood and appreciated that the claimed subject matter is not limited by the order of the steps or blocks, as some steps may occur in different orders or concurrently with other steps from what is depicted and described herein. Moreover, one skilled in the art would understand that the steps illustrated in the flow diagram are not exclusive and other steps may be included or one or more of the steps in the example flow diagram may be deleted without affecting the scope and spirit of the present disclosure.

What has been described above includes examples of the various aspects. It is, of course, not possible to describe every conceivable combination of components or methodologies for purposes of describing the various aspects, but one of ordinary skill in the art may recognize that many further combinations and permutations are possible. Accordingly, the subject specification is intended to embrace all such alternations, modifications and variations that fall within the spirit and scope of the appended claims.

The invention claimed is:

1. A method for transmitting, by a home evolved NodeB (HeNB)/X2-proxy, a transport network layer (TNL) address in a wireless communication system, the method comprising:
   receiving a mobility management entity (MME) configuration transfer message from a MME, the MME configuration transfer message including an indication of whether a direct X2 interface or an indirect X2 interface is to be established between a macro evolved NodeB (eNB) and a HeNB, the indication being generated by the macro eNB;
   forwarding the MME configuration transfer message to the HeNB;
   receiving an eNB configuration transfer message from the HeNB, the eNB configuration transfer message including a TNL address of the HeNB and an eNB identifier (ID) of the HeNB; and
   upon receiving the eNB configuration transfer message from the HeNB, determining a TNL address and an eNB ID to be transmitted to the MME in the eNB configuration transfer message based on the indication of whether the direct X2 interface or the indirect X2 interface is to be established between the macro eNB and the HeNB.

2. The method of claim 1, further comprising:
   transmitting a modified eNB configuration transfer message to the MME if the indication indicates that the indirect X2 interface is to be established between the macro eNB and the HeNB, the modified eNB configuration transfer message including a TNL address of the HeNB GW/X2-proxy and an eNB ID of the HeNB GW/X2-proxy instead of a TNL address of the HeNB and an eNB ID of the HeNB.

3. The method of claim 1, further comprising:
   forwarding the eNB configuration transfer message to the MME if the indication indicates that the direct X2 interface is to be established between the macro eNB and the HeNB, the eNB configuration transfer message including a TNL address of the HeNB and an eNB ID of the HeNB.

4. The method of claim 1, wherein the MME configuration transfer message includes an eNB ID of the macro eNB, a tracking area identifier (TAI) of the macro eNB, an eNB ID of the HeNB, a TAI of the HeNB and a self-organizing network (SON) information request.

5. The method of claim 1, further comprising:
   assisting the macro eNB to initiate the X2 interface setup if the indication indicates that the indirect X2 interface is to be established between the macro eNB and the HeNB.

6. The method of claim 1, wherein the macro eNB initiates the X2 interface setup with the HeNB if the indication indicates that the direct X2 interface is to be established between the macro eNB and the HeNB.

7. A method for transmitting, by a home evolved NodeB (HeNB)/X2-proxy, a transport network layer (TNL) address in a wireless communication system, the method comprising:
   receiving an evolved NodeB (eNB) configuration transfer message from a HeNB;
   forwarding the eNB configuration transfer message to a mobility management entity (MME);
   receiving a MME configuration transfer message from the MME, the MME configuration transfer message including an indication of whether a direct X2 interface or an indirect X2 interface is to be established between a macro eNB and the HeNB, and the MME configuration transfer message further including a TNL address of the macro eNB and an eNB identifier (ID) of the macro eNB, the indication being generated by the macro eNB; and
   upon receiving the MME configuration transfer message from the MME, determining a TNL address and an eNB ID to be transmitted to the HeNB in the MME configuration transfer message based on the indication of whether the direct X2 interface or the indirect X2 interface is to be established between the macro eNB and the HeNB.

8. The method of claim 7, further comprising:
   transmitting a modified MME configuration transfer message to the HeNB if the indication indicates that the indirect X2 interface is to be established between the macro eNB and the HeNB, the modified MME configuration transfer message including a TNL address of the HeNB GW/X2-proxy and an eNB ID of the HeNB GW/X2-proxy instead of a TNL address of the macro eNB and an eNB ID of the macro eNB.

9. The method of claim 7, further comprising:
   forwarding the MME configuration transfer message to the HeNB if the indication indicates that the direct X2 interface is to be established between the macro eNB and the HeNB, the MME configuration transfer message including a TNL address of the macro eNB and an eNB ID of the macro eNB.

10. The method of claim 7, wherein the eNB configuration transfer message includes an eNB ID of the macro eNB, a tracking area identifier (TAI) of the macro eNB, an eNB ID of the HeNB, a TAI of the HeNB and a self-organizing network (SON) information request.

11. The method of claim 7, further comprising:
    initiating the X2 interface setup with the HeNB if the indication indicates that the indirect X2 interface is to be established between the macro eNB and the HeNB.

12. The method of claim 7, wherein the HeNB initiates the X2 interface setup with the macro eNB if the indication indicates that the direct X2 interface is to be established between the macro eNB and the HeNB.

13. A method for transmitting, by a home evolved NodeB (HeNB)/X2-proxy, a transport network layer (TNL) address in a wireless communication system, the method comprising:
    receiving a mobility management entity (MME) configuration transfer message from a MME;
    forwarding the MME configuration transfer message to the HeNB;
    receiving an evolved NodeB (eNB) configuration transfer message from the HeNB, the eNB configuration transfer message including a TNL address of the HeNB and an eNB identifier (ID) of the HeNB;
    upon receiving the eNB configuration transfer message from the HeNB, generating a modified eNB configuration transfer message by modifying the TNL address of the HeNB and the eNB ID of the HeNB in the eNB configuration transfer message into a TNL address of the HeNB GW/X2-proxy and an eNB ID of the HeNB GW/X2-proxy;

transmitting the modified eNB configuration transfer message to the MME; and initiating the X2 interface setup with the macro eNB in case that the HeNB discovers the macro eNB.

14. The method of claim 13, wherein the MME configuration transfer message includes an eNB ID of the macro eNB, a tracking area identifier (TAI) of the macro eNB, an eNB ID of the HeNB, a TAI of the HeNB and a self-organizing network (SON) information request.

* * * * *